Aug. 4, 1970     O. WANASELJA     3,522,570

FAIL-SAFE OVER-VOLTAGE PROTECTOR

Filed April 8, 1968     2 Sheets—Sheet 1

INVENTOR.
OLEY WANASELJA

BY Morgan, Finnegan, Durham & Pine
ATTORNEYS

Aug. 4, 1970   O. WANASELJA   3,522,570
FAIL-SAFE OVER-VOLTAGE PROTECTOR
Filed April 8, 1968   2 Sheets-Sheet 2

INVENTOR.
OLEY WANASELJA
BY
Morgan, Finnegan, Durham & Pine
ATTORNEYS

United States Patent Office 3,522,570
Patented Aug. 4, 1970

3,522,570
FAIL-SAFE OVER-VOLTAGE PROTECTOR
Oley Wanaselja, Levittown, N.Y., assignor to AJR Electronics Corp., Levittown, N.Y., a corporation of New York
Filed Apr. 8, 1968, Ser. No. 719,429
Int. Cl. H01h *61/00, 61/017*
U.S. Cl. 337—28        8 Claims

ABSTRACT OF THE DISCLOSURE

A gas-filled hermetically sealed excess voltage protector is disclosed which has an integral fail-safe feature consisting of an annular ring of fusible material positioned in such a fashion that, in the event of a sustained over-voltage condition, the heat generated by this sustained condition will melt the fusible ring and provide a permanent electrical connection between the electrode and the electrically grounded casing of the protector.

---

This invention relates to improvements in inert gas-filled hermetically sealed excess voltage protectors commonly connected to voltage lines serving various types of electrical apparatus. Illustratively, the protector is used to safeguard communication equipment from the effects of transient overloads such as might occur because of a fault, contact with high tension lines, lightning and the like.

Gas-filled over-voltage protectors are generally constructed with one or more electrodes sealed in an enclosure which is filled with an inert gas under relatively low pressure. In one embodiment, a single electrode is sealed within the casing which is itself capable of forming a second electrode. A second type consists of two electrodes sealed within a casing. The two electrode protectors are presently manufactured with the casing made either of an electrically non-conductive material such as glass or ceramic or of a metallic material. In the latter instance, the casing itself may be utilized as a third electrode.

Under normal circumstances, gas-filled over-voltage protectors operate in the following manner. When an excess voltage appears across the lines to which the protector is connected, the gas in the protector will become ionized and thereby reduce the impedance of the gap. In this condition, the protector provides a low-resistance, high-current carrying path to ground and thus attenuates the excess electrical voltages. Gas-filled over-voltage protectors operate rapidly at specific striking (discharge) voltages and since they are self-restoring will withstand numerous repeated discharges.

In view of their protective function, it is important for this type of apparatus to be provided with a fail-safe feature which assures that in the event that the protector is threatened with failure or actually fails due to sustained over-load, the protector nonetheless provides protection from the excess voltage.

One of the proposed methods of providing a fail-safe feature for over-voltage protectors is to have a separate fusible element located outside, but adjacent to the casing of the protector, such as shown in U.S. patent to Wanaselja, No. 3,340,431. In this arrangement, the fusible element prevents a separate shorting bar from touching the ends of the casing of the protector. When a sustained overload occurs, sufficient heat is generated to melt the fusible element and permit the separate shorting bar to make contact with the ends of the casing of the protector and short them to ground. After a sustained overload has occurred, not only must the gas-filled protector and the fusible element be replaced but the housing itself must be cleaned of the molten material which previously comprised the fusible element.

Another proposed method of providing a fail-safe feature for over-voltage protectors is to manufacture the electrodes of a fusible material as illustrated in U.S. patent to Jones, No. 3,289,027. Upon a sustained overload, the electrode purportedly sags and touches the grounded metallic casing. Such a device has, however, several substantial shortcomings. First, the device is orientation-sensitive and can be utilized only in the horizontal position. Second, when the electrode sags in a sustained overload, it may arc in contacting the casing, causing a defective electrical contact.

It is an object of the present invention to overcome or substantially reduce the foregoing shortcomings and to fulfill this objective, the present invention provides a fail-safe feature inside the protector which is both reliable and orientation-insensitive and especially amenable to low cost, high speed, mass production techniques. Additionally, a protector according to the present invention provides an increase in safety, simplifications in servicing, and reductions in size and cost. Moreover, the invention provides additional protective features which are attained without significantly impairing the essential simplicity of construction.

These and other objects and advantages of the invention will become apparent from the following specification which sets forth several illustrative embodiments of the invention. The drawings which form part of this specification serve to illustrate exemplary embodiments of the invention of which:

Figure 1:
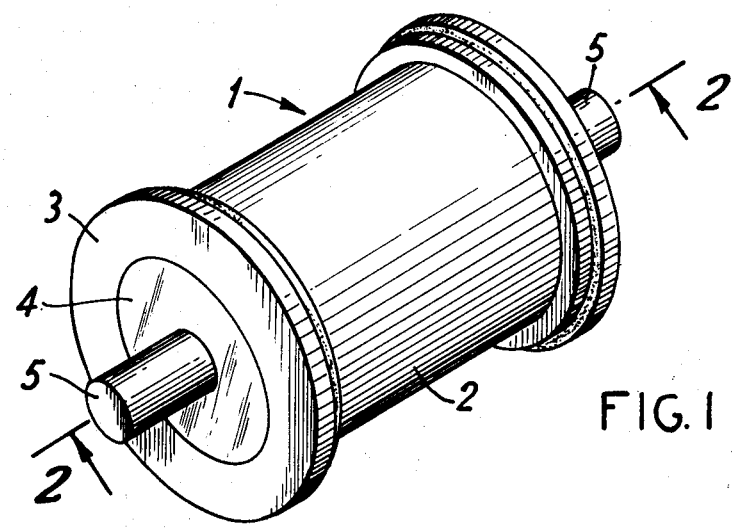
FIG. 1 is an isometric view of an over-voltage sensing element according to the invention.
Figure 2:
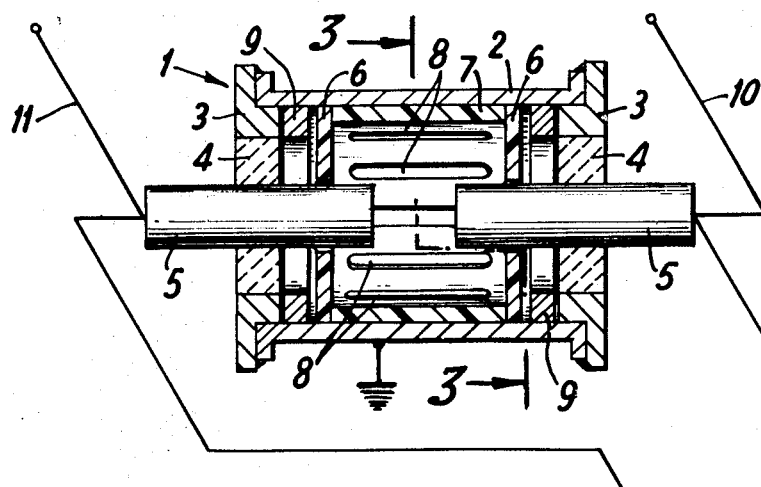
FIG. 2 is a schematic diagram illustrating a circuit arrangement utilizing the over-voltage sensing element of FIG. 1 shown in cross-sectional view taken along the lines 2—2 of FIG. 1.
Figure 3:
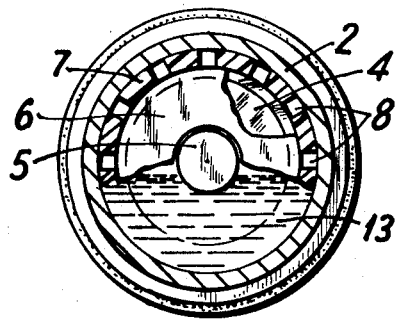
FIG. 3 is a view taken along lines 3—3 of FIG. 2.

FIGS. 1 to 3 illustrate a fail-safe over-voltage protector according to the invention which is capable of multi-position operation as well as being reliable, simple in design and amenable to low cost, high speed, mass production techniques. The excess voltage protector 1 of FIGS. 1 to 3 includes a cylindrical metal housing 2 which is illustrative of a high metallic composition, such as a nickel-iron alloy. The ends of the housing 2 are each provided with a header assembly including a ferrule 3 which is preferably of the same metallic composition as the cylinder. The ferrule 3 may be connected to the ends of the cylinder either by a cold-welding or ultrasonic welding process.

Disposed coaxially in the ferrules in spaced relation therewith are insulative compression seals 4 which are preferably of glass or ceramic composition. The seals 4 are of annular shape and include central bores through which electrodes 5 pass. Metal-to-ceramic seals are formed between each of the seals 4 and its respective ferrule 3 and electrode 5. The interior ends of the electrodes 5 are spaced a predetermined axial distance from each other depending upon the desired voltage characteristics of the protector.

Surrounding each of the electrodes 5 immediately adjacent each header assembly are annular rings 9 of fusible electrically-conductive material, such as, for example, solder composed of 63% lead and 37% tin. In their normal position, the rings 9 are held in an electrically insulated position from the electrodes 5. Means for holding the fusible element 9 in a predetermined position within the casing consists, illustratively, of the washer and sleeve arrangement illustrated in FIG. 2.

This arrangement consists of annular washers 6 which are configured to provide a tight fit between their center bores and the electrodes 5. The washers 6 should be constructed of an electrically-nonconductive material of sufficient purity to avoid contamination of the inert gas with which the protector is filled and which also have sufficient heat-resistive properties to withstand molten solder. Illustratively, the washers are constructed of mica which possesses these properties. The washers 6 are held in fixed spaced relationship by a cylindrical tube 7 which is constructed of electrically-insulating material and is provided with a plurality of longitudinal slots 8.

In addition to holding the annular ring 9 in position, the washers 6 also serve to confine the solder when the rings fuse as described hereinafter.

The construction of the protector permits it to be quite easily manufactured. An illustrative method of manufacture is as follows: One of the glass-metal headers 3 and 4 is cold-welded to the casing 2 at one end thereof. The tube assembly is then evacuated at a high temperature, e.g. 300° F., to de-gas all materials. The assembly is then transferred to an atmosphere control enclosure (dry box) which typically contains dry nitrogen. Argon or other desired gas is injected into the dry box whereupon the tube is filled with gas. The opposite header assembly is then welded by either a cold-welding or ultrasonic welding process to the casing 2 to complete the assembly. Testing for leaks and electrical characteristics then follow. This construction of the protector also eliminates the need for a separate evacuation tube, as required in the prior art, e.g. Jones U.S. Pat. No. 3,289,027, and allows the protector to be directly filled with a suitable gas such as argon and hermetically sealed. The pressure of the gas, customarily in the range of $10^{-1}$ to $10^{-4}$ torr, will depend upon the desired rating of the protector. The rating of the protector can also be varied by varying the spacing between the electrodes.

In an illustrative use, the electrodes 5 of the over-voltage protector are connected across the electrical lines 10 and 11 which lead from a voltage source (not shown) to the equipment 12. In normal operation, the metallic casing 2 is electrically connected to earth ground. When the voltage between the lines 10 and 11 is within normal limits, the over-voltage protector will remain an open-circuit between the lines. Should the voltage between lines 9 and 10 exceed permissible limits, the gas in the protector is ionized and an arc is created between the ends of the two electrodes 5. Arcing also occurs between the electrodes and the grounded metallic casing 2, through the longitudinal slots 8 in the insulating tube 7. A short circuit is thus created between the lines 10 and 11 and ground, reducing the voltage and shunting the current associated with the over-voltage to ground and thus protecting the equipment 12.

It has been discovered that a prolonged or sustained over-voltage condition poses a substantial threat of failure, and may actually cause the failure of gas-filled over-voltage protectors. Should an ordinary protector actually fail, its protective feature would no longer be present and the excessive voltage and current associated with the prolonged condition would be allowed to pass to the equipment and damage it.

Such a possibility is eliminated by the fail-safe features of the over-voltage protectors of the present invention. In the over-voltage protector illustrated in FIGS. 1 through 3, the fail-safe feature is provided by the fusible electrically-conductive rings 9. In the case of a sustained over-voltage, the arc inside the protector generates sufficient heat to melt the fusible rings 9. Since each of the insulating washers 6 is connected to its respective electrode 5, the molten material is retained and forms an electrical connection between the electrode 5 and the grounded casing 2. This is illustrated in the cross-sectional view of FIG. 3 where the molten material 13 which formerly comprised the annular rings 9 is shown in contact with the electrode 5, hence permanently shorting the electrode 5 and line 10 to ground through the metallic casing 2.

It should be understood that the over-voltage protector illustrated in FIGS. 1 through 3 is not orientation-sensitive and its fail-safe feature is operable in any position depending upon the necessities of a particular installation.

Figure 4:
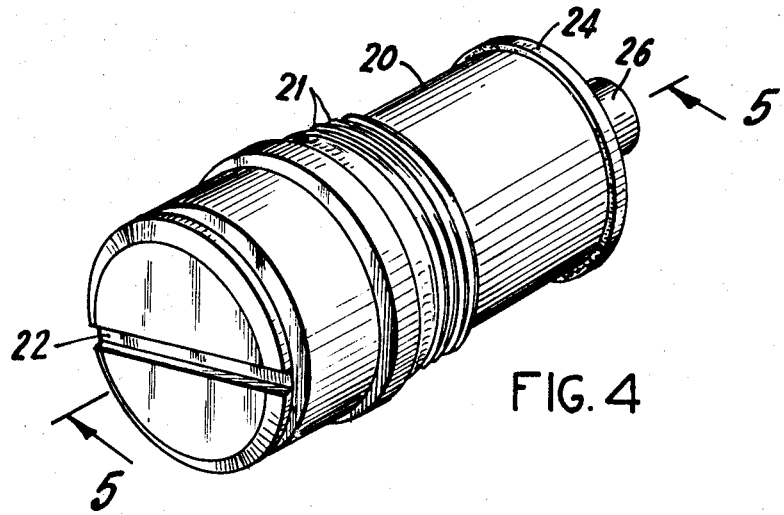
FIG. 4 is an isometric view of another embodiment of the over-voltage sensing element according to the invention.
Figure 5:
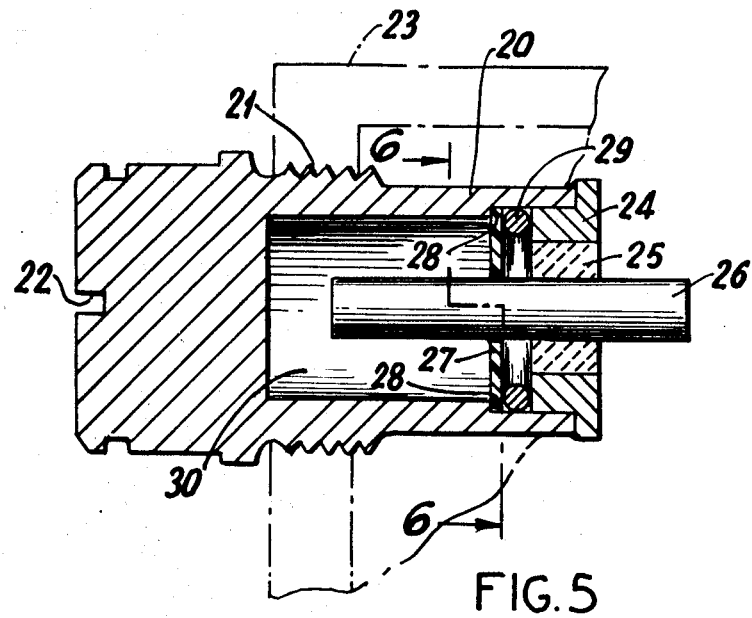
FIG. 5 is a partial cross-sectional view taken along lines 5—5 of FIG. 4.

Another embodiment of the invention is illustrated in FIGS. 4 and 5. There the fail-safe feature of the present invention is embodied in a single electrode gas-filled voltage protector housed in commonly-used arrester unit shells. Such a construction allows the protector to be utilized in standard protector mountings. This embodiment includes an arrester unit shell 20, one end of which is closed and is formed with screw threads 21 and a groove 22 for mounting in a housing 23. The arrester unit shell is illustratively of a high metal alloy composition. The open end of the arrester unit 20 is provided with a header assembly including a ferrule 24 which is preferably of the same metallic composition as the cylinder. The ferrule 24 may be connected to the ends of the arrester unit 20 either by cold-welding or ultra-sonic welding. Disposed axially in the ferrule 24 in spaced relation therewith is an insulative compression seal 25 which is preferably of glass or ceramic composition. The seal 25 is of annular shape and includes a central bore through which an electrode 26 passes to provide electrical line contact. Metal-to-ceramic seals are formed between ferrule 24, the seal 25 and the electrode 26.

Surrounding the electrode 26 immediately adjacent the header assembly are the fail-safe protection means consisting illustratively of an annular ring 29 of fusible electrically conductive material, such as, for example, solder composed of 63% lead and 37% tin The ring 29 is held in a predetermined position within the casing 20 by means of a washer 27 of insulating material which, at its outer edge, bears against an internal shoulder 28 in the casing 20. In its normal position, the ring 29 is not in electrical contact with the electrode 26. The washer 27 should be made of a material which has sufficient heat-resistive properties to withstand molten solder and be of sufficient purity to avoid contamination of the inert gas with which the protector is filled. Illustratively, the washer is constructed of mica which possesses these properties.

As with the protector illustrated in FIGS. 1 through 3, the simplicity of design and construction of the protector illustrated in FIGS. 4 and 5 permits it to be quite easily manufactured. The arrester unit shell is evacuated at a high temperature, e.g. 300° F., to de-gas all the material. The assembly is then transferred to a dry box which typically contains dry nitrogen. Argon or other desired gas is then injected into the dry box whereupon the tube is filled with gas. The header assembly is then either cold-welded or ultra-sonic welded to the arrester unit shell or casing 20 to complete the assembly. Testing for leaks and electrical characteristics then follows.

Figure 6:
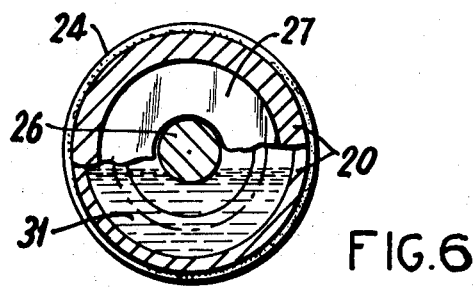
FIG. 6 is a view taken along lines 6—6 of FIG. 5.

The operation of the over-voltage protector of FIGS. 4 to 6 is similar to that described and illustrated in FIGS. 1 to 3. Under continuous power surges, the fusible ring 29 melts, forming a pool 31 of electrically-conductive material which grounds the electrode 26 to the casing 20, as illustrated in FIG. 6. This prevents what could otherwise be an open circuit and an unprotected line. Obviously, since the device of FIGS. 4 to 6 has only a single electrode 26, at least two such protectors must be utilized to protect electrical circuits such as found in telephone systems.

It should be understood that the over-voltage protector illustrated in FIGS. 4 through 6 is not orientation-sensitive and its fail-safe feature is operable in any position depending upon the necessities of a particular installation. Additionally, the design of this particular protector permits it to replace existing air-gap and gas-filled protectors with identical mounting means.

In the practice and study of the invention, modifications will undoubtedly occur to those skilled in the art. The invention is thus not limited to the specific devices shown herein but departures may be made therefrom within the scope of the accompanying claims without departing from the principles of the invention and without sacrificing its chief advantages.

What is claimed is:

1. A hermetically sealed gas-filled excess voltage protector comprising:
    an electrically-conductive sleeve;
    a pair of electrodes;
    means for disposing within said housing said pair of electrodes in a predetermined spaced axial distance from each other;
    an electrically non-conductive washer connected to each of said electrodes;
    a longitudinal sleeve of insulating material disposed between said washers; and
    an annular ring of low melting point material disposed adjacent to each of said washers;
    said annular rings forming an electrical connection between said electrode and said casing in the condition of a sustained overload.

2. A hermetically sealed gas-filled excess voltage protector comprising:
    a cylindrical electrically-conductive casing;
    a pair of electrodes extending into said casing;
    a header assembly connected to each of said electrodes and sealed to said casing;
    an electrically non-conductive washer connected to each of said electrodes;
    a longitudinal sleeve of insulating material located between said washers and retaining said washers in a fixed predetermined relationship; and
    an electrically non-conductive washer connected to rounding each of said electrodes and located between said washer and said header assembly;
    said annular rings forming an electrical connector between said electrode and said casing when said annular ring melts.

3. A hermetically sealed gas-filled excess voltage protector comprising:
    a screw-threaded electrically-conductive casing formed with one end closed;
    an electrode extending into said casing;
    a header assembly connected to said electrode and sealed to said casing;
    an electrically non-conductive washer connected to said electrode and abutting an internal shoulder formed in said casing; and
    an annular ring of low melting point material surrounding said electrode and located between said washer and said header assembly;
    said annular ring forming an electrical connection between said electrode and said casing when said annular ring melts.

4. A hermetically sealed gas-filled excess voltage protector comprising:
    an electrically-conductive housing;
    a pair of electrodes in spaced relationship to each other and to said housing;
    means for axially disposing said electrodes within said housing in said spaced relationship;
    electrically non-conductive washers secured about said electrodes so as to partition the interior of said housing into a plurality of cavities;
    a slotted non-conductive cylindrical tube axially positioned about said electrodes and between said washers; and
    fusible means positioned in electrical-insulative relationship to said electrodes, positioned within said housing in cavities adjacent to the cavity containing said slotted cylindrical tube so as to provide an electrically conductive path between said electrodes and said housing in the event of a sustained overload.

5. A hermetically sealed gas-filled excess voltage protector as described in claim 4 wherein said fusible means positioned in electrical-insulative relationship to said electrodes comprises an annular ring of a low melting point material positioned adjacent to said housing, said annular ring forming an electrically conductive path between said electrode and said housing when in a molten state.

6. A hermetically sealed gas-filled excess voltage protector as defined in claim 4 wherein said fusible means are configured to provide upon fusing, said electrically conductive path independent of the orientation of said voltage protector.

7. A hermetically sealed gas-filled excess voltage protector comprising:
    an electrically-conductive housing;
    an electrode in spaced relationship to said housing;
    means for axially disposing said electrode in said spaced relationship to said housing;
    an electrically non-conductive washer secured about said electrode so as to partition said housing into a plurality of cavities, one of said cavities being utilized for electrical discharge; and
    fusible means located in electrically-insulative relationship to said electrode within a cavity of said housing other than the cavity utilized for electrical discharge, said fusible means providing an electrically conductive path between said electrode and said housing in the event of a sustained overload.

8. A hermetically sealed gas-filled excess voltage protector as defined in claim 7 wherein the exterior of said housing is designed to permit the mounting of said protector within a recess.

References Cited

UNITED STATES PATENTS

| 3,289,027 | 11/1966 | Jones | 337—28 XR |
| 3,210,588 | 10/1965 | Demurjian | 337—28 XR |
| 1,144,029 | 6/1915 | Creighton | 337—29 XR |
| 875,810 | 1/1908 | Hall et al. | 337—413 |

OTHER REFERENCES

German printed application, DAS 1,067,112, October 1959, K. Wulsten.

BERNARD A. GILHEANY, Primary Examiner

D. M. MORGAN, Assistant Examiner

U.S. Cl. X.R.

337—32, 34

UNITED STATES PATENT OFFICE
CERTIFICATE OF CORRECTION

Patent No. 3,522,570　　　　　　　　　　　　　　August 4, 1970

Oley Wanaselja

It is certified that error appears in the above identified patent and that said Letters Patent are hereby corrected as shown below:

Column 5, line 36, "an electrically non-conductive washer connected to" should read -- an annular ring of low melting point material sur- --.

Signed and sealed this 23rd day of February 1971.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents